United States Patent [19]

Nakamura et al.

[11] Patent Number: 5,432,225
[45] Date of Patent: Jul. 11, 1995

[54] THERMOTROPIC RESIN COMPOSITION CONTAINING A GRAPHITE

[75] Inventors: Kiyokazu Nakamura; Noriaki Goto, both of Nagoya; Toshihide Inoue, Ichinomiya, all of Japan

[73] Assignee: Toray Industries, Inc., Japan

[21] Appl. No.: 139,917

[22] Filed: Oct. 20, 1993

[30] Foreign Application Priority Data

Oct. 22, 1992 [JP] Japan ............................. 4-284549
Jan. 21, 1993 [JP] Japan ............................. 5-008484
Jun. 23, 1993 [JP] Japan ............................. 5-152418
Jun. 23, 1993 [JP] Japan ............................. 5-152419

[51] Int. Cl.$^6$ ............................. C08K 3/04; C08K 5/02
[52] U.S. Cl. ............................. 524/495; 524/465; 524/496
[58] Field of Search ............. 524/495, 496, 464, 466

[56] References Cited

U.S. PATENT DOCUMENTS

| 4,489,190 | 12/1984 | Froix | 524/495 |
| 4,889,886 | 12/1989 | Wada et al. | 524/449 |
| 5,124,397 | 6/1992 | Kanazawa et al. | 524/496 |
| 5,124,397 | 6/1992 | Kanazawa et al. | 524/496 |
| 5,131,827 | 7/1992 | Tasaka | 524/404 |
| 5,221,705 | 6/1993 | Inoue et al. | 524/466 |

FOREIGN PATENT DOCUMENTS

| 0226361A1 | 6/1987 | European Pat. Off. |
| 0485181A2 | 5/1992 | European Pat. Off. |
| 2233661A | 1/1991 | United Kingdom |

*Primary Examiner*—Tae H. Yoon
*Attorney, Agent, or Firm*—Austin R. Miller

[57] ABSTRACT

A thermotropic resin composition containing (A) 100 parts by weight of a thermotropic polyester, a thermotropic polyesteramide or a mixture thereof, forming an anisotropic molten phase and (B) 1 to 200 parts by weight of a graphite having a fixed carbon content of 98% or more, a crystallinity of 80 to 95%, and an average particle size of 1 to 200 μm.

14 Claims, No Drawings

THERMOTROPIC RESIN COMPOSITION CONTAINING A GRAPHITE

BACKGROUND OF THE INVENTION

1. Field of the Invention

The present invention relates to a thermotropic resin composition capable of giving a shaped article having superior heat resistance, moldability, and mechanical properties and, especially having a balance of an excellent dimensional stability and an excellent wear resistance.

2. Description of the Related Art

In recent years, there has been increased demand for higher performance plastics. Large numbers of polymers with various new performance properties have been developed and supplied to the market. Among them, thermotropic polymers with optical anisotropy which feature parallel arrays of molecular chains, are drawing attention due to their having superior flowability and mechanical properties.

As polymers having anisotropic molten phases, there have been disclosed, for example, the thermotropic polymer comprised of p-hydroxybenzoic acid copolymerized with polyethylene terephthalate (Japanese Unexamined Patent Publication (Kokai) No. 49-72393), the thermotropic polymer comprised of p-hydroxybenzoic acid and 6-hydroxy-2-naphthoic acid copolymerized together (Japanese Unexamined Patent Publication (Kokai) No. 54-77691), and the thermotropic polymer comprised of p-hydroxybenzoic acid copolymerized with 4,4'-dihydroxydiphenyl and terephthalic acid and isophthalic acid (Japanese Examined Patent Publication (Kokoku) No. 57-24407).

These thermotropic polymers, however, have had low mechanical properties in the traverse direction to the machine direction and further have had a large mold shrinkage factor and otherwise extremely great mechanical anisotropy and dimensional anisotropy. Further, thermotropic polymers have molecular chains which are easily oriented and easily form fibriles, so have a large coefficient of dynamic friction and insufficient wear resistance and thus it is extremely difficult to be used in applications requiring large wear resistances.

As a method for reducing these defects, for example, in Japanese Unexamined Patent Publication (Kokai) No. 61-285249, it has been attempted to blend into a thermotropic polymer for making gears a fibrous filler and graphite or another solid lubricant, but while this was effective in improving the mechanical strength, the lubricating properties were not necessarily sufficient.

Further, Japanese Unexamined Patent Publication (Kokai) No. 58-19397 discloses a composition for a lubricating material comprised of oxybenzoyl polyester, natural flake graphite, and polytetrafluoroethylene, but while the coefficient of dynamic friction was small, the amount of wear at a high PV value increased and the impact resistance was reduced.

U.S. Pat. No. 4,889,886 discloses a method of blending into the thermotropic polymer a plate-like powder such as mica, talc, or graphite for the purpose of reducing the anisotropy, but there were still problems in the lubricating properties and this was not sufficient.

SUMMARY OF THE INVENTION

Accordingly, the objects of the present invention are to eliminate the above-mentioned problems and provide a thermotropic resin composition capable of giving a shaped article having superior heat resistance, moldability, and mechanical properties and, in particular, a balance of an excellent dimensional stability and an excellent wear resistance.

The present inventors engaged in intensive studies to solve the above problem and as a result reached the present invention.

In accordance with the present invention, there is provided a thermotropic resin composition comprising (A) 100 parts by weight of a thermotropic polyester, a thermotropic polyesteramide, or a mixture thereof forming an anisotropic molten phase and (B) 1 to 200 parts by weight of a graphite having a fixed carbon of 98% or more, a crystallinity of 80 to 95%, and an average particle size of 1 to 200 $\mu$m.

In this thermotropic resin composition, preferably the thermotropic polyester, the thermotropic polyesteramide or a mixture thereof, forming an anisotropic molten phase (A) is at least one thermotropic polyester or thermotropic polyesteramide selected from the group consisting of fully aromatic thermotropic polyesters or fully aromatic thermotropic polyesteramides, thermotropic polyesters having ethylene dioxy units and thermotropic polyesteramides having ethylene dioxy units, more preferably the thermotropic polyester of (A) is comprised of the structural units of the following (I), (II), and (IV) or (I), (II), (III), and (IV):

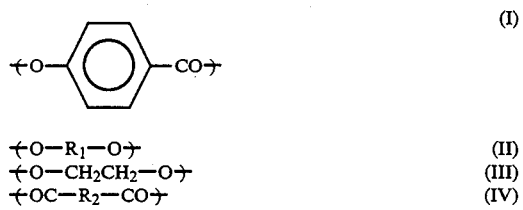

$$(O-R_1-O) \quad (II)$$
$$(O-CH_2CH_2-O) \quad (III)$$
$$(OC-R_2-CO) \quad (IV)$$

wherein, $R_1$ in the formulae represent at least one base selected from the group consisting of:

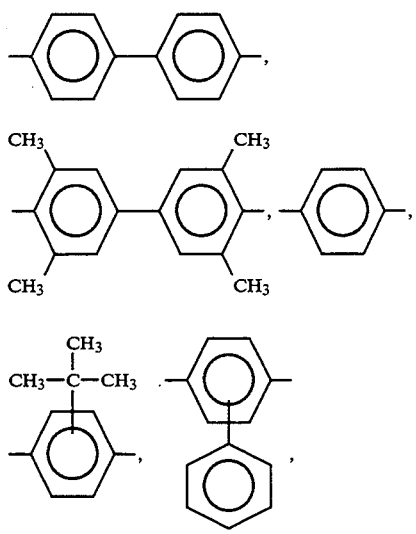

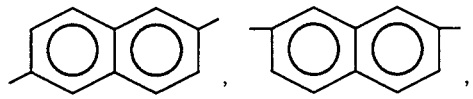

-continued

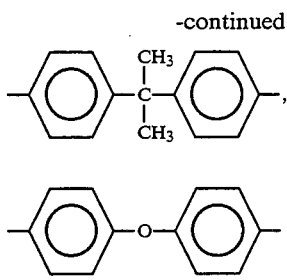

and $R_2$ repesent at least one base selected from the group consisting of:

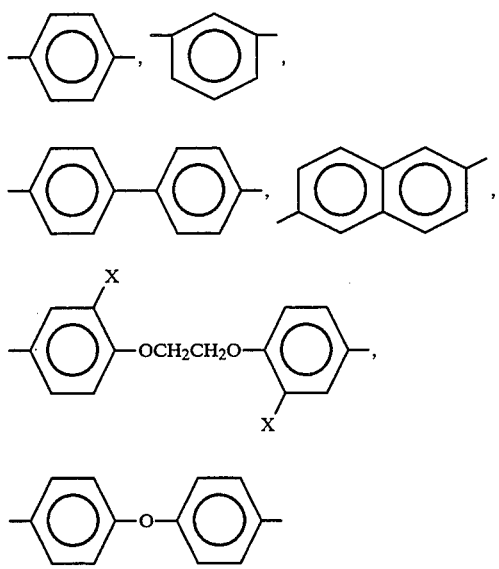

Further, in the formulae, X represents a hydrogen atom or a chlorine atom and the total number of moles of the structural units (II) and (III) and the number of moles of the structural units (IV) are substantially equal.

In the thermotropic resin composition, there is blended in 0.5 to 60 parts by weight of an organic bromide based upon 100 parts by weight of the thermotropic polyester and/or a thermotropic polyester-amide forming an anisotropic molten phase.

In the thermotropic resin composition, preferably the organic bromide is a poly(bromostyrene) of a weight average molecular weight of $1 \times 10^3$ to $120 \times 10^4$ comprising as its main component at least one type of the following structural units produced from a bromostyrene monomer:

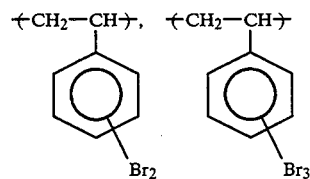

In the thermotropic resin composition, preferably there is further included not more than 200 parts by weight of a filler with respect to 100 parts by weight of the thermotropic resin composition.

PREFERRED EMBODIMENTS OF THE INVENTION

The "thermotropic polyester" referred to in the present invention is a polyester forming an anisotropic molten phase which is comprised of structural units selected from an aromatic oxycarbonyl unit, aromatic dioxy unit, aromatic dicarbonyl unit, ethylenedioxy unit, etc. The "thermotropic polyesteramide" is a polyesteramide forming an anisotropic molten phase which is comprised of structural units selected from the above-mentioned structural units and aromatic iminocarbonyl units, aromatic diimino units, and aromatic iminophenoxy units.

The thermotropic polyester and/or thermotropic polyesteramide used in the present invention may be a fully aromatic thermotropic polyester, preferably one having a naphthalene ring, a fully aromatic thermotropic polyesteramide, preferably one having a naphthalene ring, a thermotropic polyester having ethylenedioxy units, or a thermotropic polyesteramide having ethylenedioxy units.

As a preferable example of a thermotropic polyester, mention may be made of a polyester comprised of the structural units of (I), (II), and (V) or (I), (II), (III), and (IV).

The above-mentioned structural unit (I) is a structural unit of a polyester produced from p-hydroxybenzoic acid, the structural unit (II) is a structural unit produced from an aromatic dihydroxy compound selected from 4,4'-dihydroxydiphenyl, 3,3',5,5'-tetramethyl-4,4'-dihydroxydiphenyl, hydroquinone, t-butylhydroquinone, phenylhydroquinone, 2,6-dihydroxynaphthalene, 2,7-dihydroxynapthalene, 2,2-bis(4-hydroxyphenyl)propane, and 4,4-dihydroxydiphenylether, the structural unit (III) is a structural unit produced from ethylene glycol, and the structural unit (IV) is a structural unit produced from an aromatic dicarboxylic acid selected from terephthalic acid, isophthalic acid, 4,4'-diphenyldicarboxylic acid, 2,6-naphthalene dicarboxylic acid, 1,2-bis(phenoxy)ethane-4,4-dicarboxylic acid, 1,2-bis(2-chlorophenoxy)ethane-4,4'-dicarboxylic acid, and diphenyl ether dicarboxylic acid. Among these structures, those having an $R_1$ of

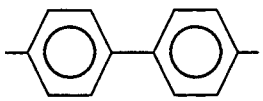

and an $R_2$ of

are particularly preferable.

Further, as the thermotropic polyesteramide, a polyesteramide forming an anisotropic molten phase which includes p-iminophenoxy units produced from p-aminophenol other than the above-mentioned structural units (1) to (IV) are preferable.

The thermotropic polyester preferably used in the present invention is a copolymer comprised of the above-mentioned structural units (I), (II), and (IV) or (I), (II), (III), and (IV). The amounts of the copolymerization of the structural units (I), (II), (III), and (IV) are not limited. However, the following copolymerization amounts are preferable in consideration of the flowability property thereof.

Namely, in the case of those containing the above-mentioned structural unit (III), the molar fraction of the total of the structural units (I) and (II) to the total of the above-mentioned structural units (I), (II) and (III) is preferably 60 to 95 mol %, particularly preferably 75 to 93 mol %, and more particularly preferably 82 to 92 mol % in consideration of the heat resistance, flame resistance and mechanical properties thereof. In addition, the molar fraction of the structural unit (III) to the total of the structural units (I), (II) and (III) is preferably 40 to 5 mol %, particularly preferably 25 to 7 mol % and more particularly preferably 18 to 8 mol %.

In addition, the molar fraction of the structural unit (I) to the total of the structural unit (I) and (II) is preferably 75 to 95 mol %, and particularly preferably 78 to 93 mol % in consideration of the balance between the heat resistance and the flowability. Furthermore, it is preferable that, the total number of moles of the structural unit (II) and the structural unit (III) is substantially equal to the total number of moles of the structural unit (IV).

On the other hand, in the case of those not containing the above-mentioned structural unit (III), the molar fraction of the structural unit (I) to the total of the structural units (I) and (II) is preferably 40 to 90 mol %, and particularly preferably 60 to 88 mol %. It is preferable that the number of moles of the structural unit (II) is substantially equal to the number of moles of the structural unit (IV).

Note that when performing condensation polymerization with the above-mentioned thermotropic polyesters preferably used in the present invention, other than the above-mentioned components forming the structural units (I) to (IV), it is possible to further copolymerize, in a range of a small amount of an extent not impairing the object of the present invention, 3,3'-diphenyldicarboxylic acid, 2,2'-diphenyldicarboxylic acid, and other aromatic dicarboxylic acids, adipic acid, azelaic acid, sebacic acid, dodecanedionic acid, and other aliphatic dicarboxylic acids, hexahydroterephthalic acid and other alicyclic dicarboxylic acids, chlorohydroquinone, methylhydroquinone, 4,4'-dihydroxydiphenylsulfone, 4,4'-dihydroxydiphenylsulfide, 4,4'-dihydroxybenzophenone, and other aromatic diols, 1,4-butanediols, 1,6-hexanediols, neopentyl glycol, 1,4-cyclohexanediol, 1,4-cyclohexanedimethanol, and other aliphatic and alicyclic diols and m-hydroxybenzoic acid, 2,6-hydroxynapthoic acid, and other aromatic hydroxycarboxylic acids and p-aminophenol, p-amino benzoic acid, and the like.

The method of production of the above-mentioned thermotropic polyester and/or thermotropic polyester amide preferably used in the present invention is not particularly limited. It may be made in accordance with the known methods of condensation polymerization of polyester.

For example, in the production of the above-mentioned preferably usable thermotropic polyesters, which may be made from the methods of production of (1) and (2) in the case of those not containing the above-mentioned structural units (III), and (3) in the case of those containing the structural units (III) are included.

(1) Method of production by the deacetylation condensation polymerization reaction from p-acetoxybenzoic acid and 4,4'-diacetoxydiphenyl, 4,4'-acetoxybenzene, and other aromatic dihydroxy compound diacylates and terephthalic acid and other aromatic dicarboxylic acids.

(2) Method of production by causing a reaction of acetic anhydride with p-hydroxybenzoic acid and 4,4'-dihydroxydiphenyl, hydroquinone and other aromatic dihydroxy compounds, terephthalic acid and other aromatic dicarboxylic acids, acylating the phenolic hydroxy groups, then performing deacetylation condensation polymerization.

(3) Method of production by method of (1) or (2) in the presence of a polyethylene terephthalate or other polyester polymer, oligomer, or bis($\beta$-hydroxyethyl) terephthalate or other aromatic dicarboxylic acid bis($\beta$-hydroxyethyl) ester.

These condensation polymerization reactions may proceed without a catalyst, but sometimes it is preferable to add stannous acetate, tetrabutyl titanate, potassium acetate, sodium acetate, antimony trioxide, metal magnesium, and other metal compounds.

The thermotropic polyester and/or thermotropic polyester amide preferably used in the present invention is one which enables measurement of the inherent viscosity (logarithmic viscosity) in pentafluorophenol. At that time, the value measured at a concentration of 0.1 g/dl and 60° C. is preferably 0.5 dl/g or more, in particular, in the case of those containing the above-mentioned structural units (III), preferably 1.0 to 3.0 dl/g and, in the case of those not containing the above-mentioned structural units (III), preferably 2.0 to 10.0 dl/g.

Further, the melt viscosity of the thermotropic polyester and/or polyesteramide in the present invention is preferably 1 to 2,000 Pa.s, particularly preferably 2 to 1,000 Pa.s.

Note that the melt viscosity is the value measured by a Koka type flow tester under conditions of a melting point (Tm) plus 10° C. and conditions of a shear rate of 1,000 (1/second).

Here, the melting point (Tm) indicates the endothermic peak temperature measured after measuring the endothermic peak temperature $Tm_1$ measured when measuring the polymer by differential calorimetric measurement from room temperature at a rate of rise of 20° C./min, then raising it to a temperature of $Tm_1$ +20° C., holding at that temperature for 5 minutes, then cooling once to room temperature at a rate of temperature drop of 20° C./min, then once again raising at a rate of 20° C./min.

As the graphite of (B) used in the present invention, it is important to use graphite with a fixed carbon content of at least 98%, a crystallinity in the range of from 80 to 95%, and an average particle size of 1 to 200 $\mu$m.

The content of fixed carbon is at least 98%, preferably at least 99%. If the content of fixed carbon is less than 98%, the amount of wear of the resin becomes greater, when it is lubricated and the effect of improvement of the wear resistance becomes poorer.

The crystallinity is 80 to 95%, preferably 82 to 94%. If less than 80%, the coefficient of dynamic friction becomes larger, when it is lubricated and the effect of improvement of the wear resistance is poor and, also, no effect of improvement of the anisotropy appears. Further, if over 95%, the impact resistance of the resin falls. Neither of these is preferable.

The average particle size of the graphite must be 1 to 200 $\mu$m, preferably 1 to 20 $\mu$m, more preferably 2 to 10 $\mu$m. If the average particle size is less than 1 $\mu$m, aggregation occurs and the dispersion becomes poor, while if over 200 μm, the physical properties fall. Neither of these is preferable.

Graphite can be roughly divided into natural graphite and synthetic graphite. In the present invention use is particularly preferably made of synthetic graphite made, for example, by the method of using oil-based coke or coal-based coke as a material, adding tar pitch etc. to this and subjecting the mixture to primary sintering at about 800° C. and further heating to about 2400° to 3000° C. to graphitize it.

The fixed carbon content of the graphite is measured by taking about 10 g of graphite powder in a crucible, weighing the weight (A) of the graphite, burning it in a furnace set to 815° C., cooling to room temperature, weighing the weight (B) of the sintered residue and then finding the content by the following formula:

Fixed carbon $(\%) = (B)/(A) \times 100$

Further, the crystallinity (P) of the graphite is the degree of crystalline orientation of the following experimental formula (1) of Warren expressed in percent:

$$d_0 = 3.354 \cdot P_1 + 3.44 (1 - P_1) \quad (1)$$

$d_0$ = average interlayer distance (Angstroms) of graphite crystals

The crystallinity (P) is calculated by equation (2) using a lattice constant ($c_0$) of $2 \times d_0$:

$$\text{Crystallinity } (P) = (6.88 - c_0)/0.173 \ (\%) \quad (2)$$

Here, the average interlayer distance ($d_0$) of the graphite crystals is found by X-ray diffraction. Specifically, it is the value obtained by packing graphite powder in an aluminum test holder of 20 mm × 18 mm × 2 mm and measuring by the reflectance method using an X-ray diffraction apparatus made by Rigaku Denki using silicon as a standard sample.

The amount of the above-mentioned graphite added is 1 to 200 parts by weight, preferably 3 to 100 parts by weight, particularly preferably 5 to 80 parts by weight based upon 100 parts by weight of the thermotropic polyester and/or thermotropic polyesteramide. If the amount added is less than 1 part by weight, no effect of improvement of the wear resistance can be expected, while if over 200 parts by weight, not only is the outer appearance of the shaped article detracted from, but also the mechanical properties fall. Neither of these cases is preferable.

It should be noted that the above-mentioned graphite used in the present invention may be treated on its surface with a known coupling agent (for example, a silane coupling agent or titanate coupling agent) etc.

The organic bromides usable as the component (C) in the present invention include known organic bromides used ordinarily as flame retardants. In particular, those having a bromine content of at least 20% by weight are preferable. Specifically, hexabromobenzene, pentabromotoluene, hexabromobiphenyl, decabromobiphenyl, hexabromocyclodecane, decabromodiphenylether, octabromodiphenylether, hexabromodiphenylether, bis(pentabromophenoxy)ethane, ethylene-bis(tetrabromophthalimide), tetrabromobisphenol A, and other lower molecular weight organic bromine compounds, brominated polycarbonate (for example, polycarbonate oligomer produced using bromobisphenol A or their copolymers with bisphenol A), bromoepoxy compounds (for example, an epoxy compound produced by a reaction between bromobisphenol A and epichlorohydrin or an epoxy compound obtained by a reaction between bromophenols and epichlorohydrin), poly(bromobenzylacrylate), bromopolyphenylene ether, bromobisphenol A, condensation products of cyanuric chloride and bromophenol, bromopolystyrene, crosslinked bromopolystyrene, crosslinked bromopoly-α-methylstyrene, and other halogenated polymers and oligomers or mixtures of the same may be mentioned. Among these, ethylene bis(tetrabromophthalimide), bromoepoxy oligomers or polymers, bromopolystyrene, crosslinked bromopolystyrene, bromopolyphenylene ether, and bromopolycarbonate are preferable, with bromopolystyrene being most preferably used.

Explaining the above-mentioned preferable organic bromine compounds in more detail, as the bromoepoxy polymer, one expressed by the following formula (i) is preferable:

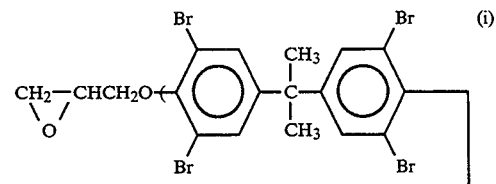

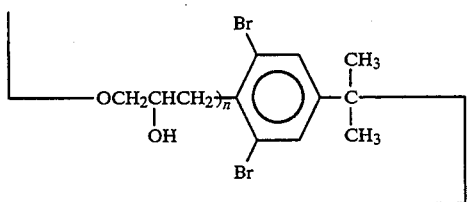

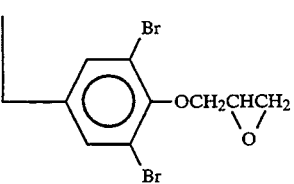

The degree of polymerization n in the above general formula (i) is preferably at least 15, more preferably 50 to 80.

As the bromopolystyrene usable in the present invention, mention may be made of bromopolystyrene produced by bromination of polystyrene obtained by radical polymerization or anionic polymerization, crosslinked bromopolystyrene, or poly(bromostyrene) having bromostyrene units expressed by the formula (ii) and/or (iii) produced by radical polymerization or anionic polymerization, preferably radical polymerization, of bromostyrene monomers, but a poly(bromostyrene) having a weight average molecular weight of $1 \times 10^3$ to $120 \times 10^4$ having as its main components the structural units expressed by the following formulas (ii) and/or (iii) produced from bromostyrene monomers is preferable.

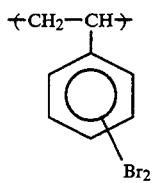

(ii)

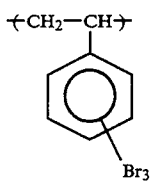

(iii)

The "bromostyrene monomer" referred hereto is preferably one wherein 2 to 3 bromine atoms are introduced by a substitution reaction into the aromatic ring per one styrene monomer and may include monobromostyrene etc. in addition to dibromostyrene and/or tribromostyrene.

The above-mentioned poly(bromostyrene) preferably includes at least 60% by weight of dibromostyrene and/or tribromostyrene units, more preferably at least 70% by weight. It may be a poly(bromostyrene) obtained by copolymerizing up to 40% by weight of monobromostyrene, preferably up to 30% by weight, in addition to the dibromostyrene and/or tribromostyrene. The weight average molecular weight of the poly(bromostyrene) is more preferably $1\times 10^4$ to $15\times 10^4$. Note that the weight average molecular weight is a value measured using a gel permeation chromatograph and is a relative value based on a standard of the molecular weight of polystyrene.

As the cross-linked bromopolystyrene, preferably polystyrene obtained by bromination of porous polystyrene cross-linked by divinylbenzene is used.

As the bromopolycarbonate, one shown by the following general formula (iv) is preferable:

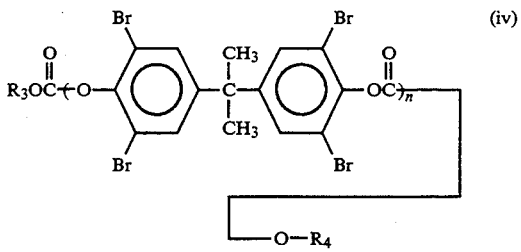

(iv)

where $R_3$ and $R_4$ independently represent a substituted or unsubstituted aryl group, among which a p-t-butylphenyl group is most preferable.

As the degree of polymerization n in the general formula (iv), at least 4 is preferable and 8 or more, in particular 8 to 25, is more preferable.

The amount of these organic bromides (C) blended in is 0.5 to 60 parts by weight, particularly 1 to 30 parts by weight, based upon 100 parts by weight of thermotropic polyester and/or thermotropic polyesteramide.

Further, in the flame retardant thermotropic resin composition of the present invention, the organic bromine compound is preferably dispersed in the composition at an average size of not more than 2.5 μm, more preferably dispersed at one not more than 2.0 μm.

As examples of the fillers which are preferably usable in the present invention, mention may be made of glass fiber, carbon fiber, aromatic polyamide fiber, potassium titanate fiber, gypsum fiber, brass fiber, stainless steel fiber, steel fiber, ceramic fiber, boron whisker fiber, asbestos fiber, mica, talc, silica, calcium carbonate, glass beads, glass flakes, glass microballoon, clay, wollastonite, titanium oxide, molybdenum disulfide, and other fibrous, powder, granular, or plate-like inorganic fillers. Further, for these fillers and reinforcers, use may be made of those treated by a silane type, titanate type, or other coupling agent or other surface treatment agent.

When adding a filler, the amount added is not more than 200 parts by weight based upon 100 parts by weight of total amount of (A) thermotropic polyester and/or thermotropic polyesteramide and (B) graphite, preferably 5 to 150 parts by weight, particularly preferably 10 to 100 parts by weight.

The thermotropic resin composition of the present invention is preferably produced by melting and mixing. Use may be made of a known method for this melting and mixing. For example, use may be made of a Banbury mixer, rubber roller, kneader, monoaxial or biaxial extrusion machine, etc. and the melting and mixing performed at a temperature of 200° to 400° C. to make the composition.

The thermotropic resin composition of the present invention obtained in this way may be used to make three-dimensional shaped articles, sheets, containers, pipes, etc. having superior heat resistance, moldability, mechanical properties, and outside appearance by ordinary shaping methods such as injection molding, extrusion, and blow molding, in particular having mechanical properties with a small anistropy. It is useful for various applications such as various types of gears, various types of cases, sensors, LEP lamps, connectors, sockets, resistors, relay case switches, coil bobbins, condensers, varicon cases, optical pickups, oscillators, various types of terminal plates, converters, plugs, printed boards, tuners, speakers, microphones, headphones, compact motors, magnetic head bases, power modules, housings, semiconductors, thermotropics, FDD carriages, FDD chasses, motor brush holders, parabolic antennas, computer parts and other such electrical and electronic parts, VTR parts, television parts, irons, hair dryers, rice cooker parts, microwave oven parts, audio parts, audio laser disks, compact disks, and other audio equipment parts, lighting parts, refrigerator parts, air-conditioner parts, typewriter parts, word processor parts and other parts of home and office electrical equipment, office computer parts, telephone parts, facsimile parts, copier parts, washing tools, oilless bearings, stern bearings, immersible bearings, and other types of bearings, motor parts, lighters, typewriters, and other machine parts, microscopes, binoculars, cameras, watches, and other optical equipment and precision machinery parts, alternator terminals, alternator connectors, IC regulators, exhaust gas valves and other various types of valves, and fuel related, exhaust system, an intake system pipes, air intake nozzle snorkles, intake manifolds, fuel pumps, engine coolant joints, carburetor bodies, carburetor spacers, exhaust gas sensors, coolant sensors, oil temperature sensors, brake pad wear sensors, throttle position sensors, crankshaft position sensors, air flow meters, brake pad wear sensors, air-conditioner thermostat bases, warm air flow control valves, radiator motor brush holders, water pump impellers, turbine vanes, wiper motor related parts, distributors, starter switches, starter relays, transmission wire harnesses, window washer nozzles, air-conditioner panel switch boards, fuel related solenoid valve coils, fuses connectors, phone terminals, electrical component insulation plates, step motor rotors, lamp sockets, lamp reflectors, lamp housings, brake pistons, solenoid bobbins, engine oil filters, ignition device cases, and other automobile and vehicle related parts.

The present invention will be explained in further detail by the following Examples.

REFERENCE EXAMPLE 1

A 994 parts by weight amount of p-hydroxybenzoic acid, 126 parts by weight of 4,4'-dihydroxybiphenyl, 112 parts by weight of terephthalic acid, 216 parts by weight of polyethylene terephthalate with an intrinsic viscosity of about 0.6 dl/g, and 960 parts by weight of acetic anhydride were charged into a reactor equipped with an agitating blade and distillation tube. Condensation polymerization was performed and the condensation polymerization was completed to obtain the resin (A-1).

The melting point (Tm) of the resin was 314° C. The melt viscosity at 324° C. and a shear rate of 1000/second was 40 Pa.sec.

REFERENCE EXAMPLE 2

A 994 parts by weight amount of p-hydroxybenzoic acid, 222 parts by weight of 4,4'-dihydroxybiphenyl, 147 parts by weight of 2,6-diacetoxynaphthalene, 1078 parts by weight of acetic anhydride, and 299 parts by weight of terephthalic acid were charged into a reactor equipped with an agitating blade and distillation tube. Condensation polymerization was performed to obtain the resin (A-2).

The melting point (Tm) of the resin was 336° C. The melt viscosity at 346° C. and a shear rate of 1000/second was 52 Pa.sec.

REFERENCE EXAMPLE 3

In accordance with Japanese Unexamined Patent Publication (Kokai) No. 49-72393, 1296 parts by weight of p-acetoxybenzoic acid and 346 parts by weight of polyethylene terephthalate with an intrinsic viscosity of about 0.6 dl/g were charged into a reactor equipped with an agitating blade and distillation tube. Condensation polymerization was performed to obtain the resin (A-3).

The melting point (Tm) of the resin was 283° C. The melt viscosity at 293° C. and a shear rate of 1000/second was 120 Pa.sec.

REFERENCE EXAMPLE 4

In accordance with Japanese Unexamined Patent Publication (Kokai) No. 54-77691, 921 parts by weight of p-acetoxybenzoic acid and 435 parts by weight of 6-acetoxynapthoic acid were charged into a reactor equipped with an agitating blade and distillation tube. Condensation polymerization was performed to obtain the resin (B).

The melting point (Tm) of the resin was 283° C. The melt viscosity at 293° C. and a shear rate of 1000/second was 200 Pa.sec.

REFERENCE EXAMPLE 5

The structure of the organic bromine compounds used in the present invention is shown in Table 1.

TABLE 1

| Type | Structure |
|------|-----------|
| FR-1 | Poly(bromostyrene) obtained by polymerizing monomers including 80 wt % of dibromostyrene, 15 wt % of monobromostyrene, and 5 wt % of tribromostyrene (59% bromine content). Weight average molecular weight of $30 \times 10^4$. |
| FR-2 | Poly(bromostyrene) obtained by polymerization of tribromostyrene monomer (68% bromine content). Weight average molecular weight of $30 \times 10^4$. |
| FR-3 | Dibrominated polystyrene obtained by bromination of polystyrene (60% bromine content). Weight average molecular weight of $26 \times 10^4$. |
| FR-4 | Tribrominated polystyrene obtained by bromination of polystyrene (68% brome content). Weight average molecular weight of $25 \times 10^4$. |
| FR-5 | Bromoepoxy polymer |
| FR-6 | Bromopolycarbonate |

EXAMPLES 1 TO 9 AND COMPARATIVE EXAMPLES 1 TO 7

The thermotropic resins obtained in Reference Examples 1 to 4 and the various types of graphite shown in Table 1 were dry blended in the ratios of Table 1, then were melted, mixed, and pelletized using a biaxial extrusion machine of 30 mm$\phi$ set to a cylinder temperature of the melting points of the thermotropic resins. The pellets were fed to a Sumitomo Nestar injection molding machine Promat 40/25 (made by Sumitomo Heavy Industries) to form square plates of $30 \times 30 \times 3.2$ (thickness) mm, square plates of $70 \times 70 \times 2$ (thickness) mm, and Izod impact strength pieces of $12.5 \times 125 \times 3.2$ (thickness) mm under conditions of a cylinder temperature of the melting point plus 10° C. and a mold temperature of 90° C.

The $30 \times 30 \times 3.2$ mm square plates and, as opposing materials, aluminum alloy (5056) were used to conduct a wear test under the following conditions utilizing a abrasive wear tester (Suzuki abrasive wear tester) to measure the amount of wear and the dynamic friction coefficient and evaluate the wear characteristics:

$P = 5$ kgf/cm$^2$ $V = 20$ m/min

Further, the $70 \times 70 \times 2$ (thickness) mm square plate was shaped and then the mold shrinkage in the machine direction (MD) of the square plate and the transverse direction (TD) to the machine direction were measured.

The difference between the mold shrinkage factor in the machine direction (MD) and the mold shrinkage factor in the transverse direction (TD) was found to evaluate the anisotropy. The smaller the above value, the smaller the anisotropy.

Further, the Izod impact test piece was used to evaluate the impact resistance in according with ASTM D256.

The results are shown in Table 2.

EXAMPLES 10 TO 12 AND COMPARATIVE EXAMPLES 8 TO 10

The same procedure was followed as in Example 2 except that joint use was made of the additives shown in Table 3 as other additives. The results are shown in Table 3.

TABLE 2

| | Thermotropic polymer | | Graphite | | | | Wear properties | | | Anistrophy | Impact resistance |
|---|---|---|---|---|---|---|---|---|---|---|---|
| | | Am't blended (parts by weight) | Fixed carbon | Crystal-linity (%) | Particle size (μm) | Am't blended (parts by weight) | Am't wear | | Dynamic friction coefficient | Difference in mold shrinkage in MD direction and TD direction | Izod impact strength (J/m) |
| | Type | | | | | | Resin side (μm/h) | Other member side (×10⁻² μm/h) | | | |
| Ex. | | | | | | | | | | | |
| 1 | A-1 | 100 | 99.5 | 82 | 7 | 30 | 9 | 1 | 0.29 | 0.72 | 180 |
| 2 | A-1 | 100 | 99.5 | 90 | 7 | 30 | 11 | 1 | 0.30 | 0.73 | 181 |
| 3 | A-1 | 100 | 99.5 | 94 | 7 | 30 | 12 | 1 | 0.29 | 0.71 | 178 |
| 4 | A-1 | 100 | 99.5 | 90 | 7 | 8 | 12 | 2 | 0.32 | 0.75 | 188 |
| 5 | A-1 | 100 | 99.5 | 90 | 7 | 70 | 10 | 1 | 0.29 | 0.72 | 175 |
| 6 | A-2 | 100 | 99.5 | 90 | 7 | 30 | 10 | 1 | 0.30 | 0.73 | 165 |
| 7 | A-3 | 100 | 99.5 | 90 | 7 | 30 | 14 | 3 | 0.35 | 0.82 | 157 |
| 8 | B | 100 | 99.5 | 90 | 7 | 30 | 15 | 3 | 0.33 | 0.80 | 155 |
| 9 | A-1 | 100 | 99.5 | 90 | 148 | 30 | 25 | 5 | 0.35 | 0.50 | 145 |
| Comp. Ex. | | | | | | | | | | | |
| 1 | A-1 | 100 | 96.7 | 97 | 7 | 30 | 55 | 2 | 0.29 | 0.72 | 61 |
| 2 | A-1 | 100 | 93.2 | 75 | 7 | 30 | 10 | 2 | 0.45 | 1.30 | 120 |
| 3 | A-1 | 100 | 99.5 | 90 | 7 | 230 | 10 | 2 | 0.30 | 0.35 | 25 |
| 4 | A-1 | 100 | — | — | — | — | 250 | 15 | 0.52 | 1.50 | 510 |
| 5 | A-2 | 100 | — | — | — | — | 250 | 15 | 0.51 | 1.51 | 450 |
| 6 | A-3 | 100 | — | — | — | — | 260 | 20 | 0.55 | 1.52 | 430 |
| 7 | B | 100 | — | — | — | — | 250 | 15 | 0.55 | 1.05 | 660 |

Note: Other member: Aluminum alloy 5056

TABLE 3

| | Thermotropic polymer | | Graphite | | | | Other additive | |
|---|---|---|---|---|---|---|---|---|
| | Type | Am't blended (parts by weight) | Fixed carbon | Crystallinity (%) | Particle size (μm) | Am't blended (parts by weight) | Type | Am't blended (parts by weight) |
| Ex. | | | | | | | | |
| 10 | A-1 | 100 | 99.5 | 90 | 7 | 20 | Talc | 20 |
| 11 | A-1 | 100 | 99.5 | 90 | 7 | 20 | GF | 20 |
| 12 | A-1 | 100 | 99.5 | 90 | 7 | 20 | CF | 20 |
| Comp. Ex. | | | | | | | | |
| 8 | A-1 | 100 | 96.7 | 97 | 7 | 20 | Talc | 20 |
| 9 | A-1 | 100 | 96.7 | 97 | 7 | 20 | GF | 20 |
| 10 | A-1 | 100 | 96.7 | 97 | 7 | 20 | CF | 20 |

| | Wear resistance | | | Anisotropy | Impact resistance |
|---|---|---|---|---|---|
| | Am't of wear | | Dynamic friction coefficient | Difference of mold shrinkage in MD direction and TD direction | Izod impact strength (J/m) |
| | Resin side (μm/h) | Other member side (×10⁻² μm/h) | | | |
| Ex. | | | | | |
| 10 | 10 | 3 | 0.32 | 0.81 | 139 |
| 11 | 5 | 8 | 0.38 | 0.62 | 121 |
| 12 | 5 | 8 | 0.38 | 0.65 | 121 |
| Comp. Ex. | | | | | |
| 8 | 65 | 5 | 0.40 | 0.81 | 52 |
| 9 | 14 | 42 | 0.50 | 0.65 | 71 |
| 10 | 15 | 63 | 0.49 | 0.65 | 55 |

Note:
Other member is aluminum alloy 5056.
GF: glass fiber (fiber diameter 13 μm × fiber length 3 mm)
CF: carbon fiber (fiber diameter 13 μm × fiber length 3.3 mm)

EXAMPLES 13 to 23

The thermotropic resins obtained in Reference Examples 1 and 3, the graphites shown in Table 4, and the various organic bromine compounds shown in Table 1 were dry blended in the ratios of Table 4, then were melted, mixed, and pelletized using a biaxial extrusion machine of 30 mmφ set to a cylinder temperature of the melting points of the thermotropic resins. The pellets were fed to a Sumitomo Nestar injection molding machine Promat 40/25 (made by Sumitomo Heavy Industries) to form square plates of 30×30×3.2 (thickness) mm, square plates of 70×70×2 (thickness) mm, Izod impact strength pieces of 12.5×125×3.2 (thickness) mm, and combustion test pieces of 0.5 mm (thickness)×12.7 mm×127 mm under conditions of a cylinder temperature of the melting point plus 10° C. and a mold temperature of 90° C.

The evaluation of the wear resistance, the evaluation of the anisotropy, and the evaluation of the impact resistance were performed in the same way as in Example 1.

Further, the combustion test piece was used for a vertical type combustion test according to the specifications of UL-94 to evaluate the flame retardancy.

The results are shown in Table 4.

EXAMPLES 24 TO 27

The same procedure was followed as in Example 14 except that joint use was made of the additives shown in Table 5 as other additives. The results are shown in Table 5.

TABLE 4

| Ex. | Thermotropic polymer | | Graphite | | | | Organic bromide compound | |
|---|---|---|---|---|---|---|---|---|
| | Type | Am't blended (parts by weight) | Fixed carbon | Crystallinity (%) | Particle size (μm) | Am't blended (parts by weight) | Type | Am't blended (parts by weight) |
| 13 | A | 100 | 99.5 | 82 | 7 | 30 | FR-1 | 3 |
| 14 | A | 100 | 99.5 | 90 | 7 | 30 | FR-1 | 1 |
| 15 | A | 100 | 99.5 | 90 | 7 | 30 | FR-1 | 3 |
| 16 | A | 100 | 99.5 | 90 | 7 | 30 | FR-1 | 5 |
| 17 | A | 100 | 99.5 | 90 | 7 | 30 | FR-2 | 3 |
| 18 | A | 100 | 99.5 | 90 | 7 | 30 | FR-3 | 3 |
| 19 | A | 100 | 99.5 | 90 | 7 | 30 | FR-4 | 3 |
| 20 | A | 100 | 99.5 | 90 | 7 | 30 | FR-5 | 3 |
| 21 | A | 100 | 99.5 | 90 | 7 | 30 | FR-6 | 3 |
| 22 | A | 100 | 99.7 | 97 | 7 | 30 | FR-1 | 3 |
| 23 | B | 100 | 99.5 | 90 | 7 | 30 | FR-1 | 3 |

| Ex. | Wear properties | | | Anisotropy Difference in mold shrinkage in MD direction and TD direction | Impact resistance Izod impact strength (J/m) | Combustability UL-94 |
|---|---|---|---|---|---|---|
| | Am't wear | | Dynamic friction coefficient | | | |
| | Resin side (μm/h) | Other member side (×10$^{-2}$ μm/h) | | | | |
| 13 | 13 | 3 | 0.35 | 0.75 | 160 | V-0 |
| 14 | 11 | 1 | 0.31 | 0.72 | 178 | V-0 |
| 15 | 12 | 3 | 0.34 | 0.74 | 168 | V-0 |
| 16 | 15 | 3 | 0.35 | 0.76 | 158 | V-0 |
| 17 | 12 | 3 | 0.35 | 0.75 | 155 | V-0 |
| 18 | 15 | 3 | 0.36 | 0.77 | 115 | V-0 |
| 19 | 15 | 3 | 0.36 | 0.77 | 113 | V-0 |
| 20 | 21 | 3 | 0.36 | 0.77 | 110 | V-0 |
| 21 | 20 | 3 | 0.36 | 0.77 | 108 | V-0 |
| 22 | 55 | 3 | 0.30 | 0.72 | 60 | V-0 |
| 23 | 23 | 3 | 0.35 | 0.75 | 105 | V-0 |

Note: Other member: Aluminum alloy 5056

TABLE 5

| Ex. | Thermotropic polymer | | Graphite | | | | Organic bromine compound | |
|---|---|---|---|---|---|---|---|---|
| | Type | Am't blended (parts by weight) | Fixed carbon | Crystallinity (%) | Particle size (μm) | Am't blended (parts by weight) | Type | Am't blended (parts by weight) |
| 24 | A | 100 | 99.5 | 90 | 7 | 20 | FR-1 | 3 |
| 25 | A | 100 | 99.5 | 90 | 7 | 20 | FR-1 | 3 |
| 26 | A | 100 | 99.5 | 90 | 7 | 20 | FR-1 | 3 |
| 27 | B | 100 | 99.5 | 90 | 7 | 20 | FR-1 | 3 |

| | Other additive | | Wear resistance | | | Anisotropy Difference of mold shrinkage in MD direction and TD direction | Impact resistance Izod impact strength (J/m) | Combustability UL-94 |
|---|---|---|---|---|---|---|---|---|
| | | | Am't of wear | | Dynamic friction coefficient | | | |
| | Type | Am't blended (parts by weight) | Resin side (μm/h) | Other member side (×10$^{-2}$ μm/h) | | | | |
| Ex. | | | | | | | | |
| 24 | Talc | 20 | 12 | 3 | 0.33 | 0.82 | 135 | V-0 |
| 25 | GF | 20 | 7 | 8 | 0.38 | 0.63 | 117 | V-0 |
| 26 | CF | 20 | 7 | 8 | 0.38 | 0.66 | 118 | V-0 |
| 27 | GF | 20 | 15 | 9 | 0.40 | 0.70 | 100 | V-0 |

Note:
Other member is aluminum alloy 5056.
GF: glass fiber (fiber diameter 13 μm × fiber length 3 mm)
CF: carbon fiber (fiber diameter 13 μm × fiber length 3.3 mm)

As explained above, the thermotropic resin composition of the present invention can provide a shaped article which does not impair the superior heat resistance, flowability, moldability, and mechanical properties of the thermotropic polymer, in particular one with a balance of a superior dimensional stability and wear resistance, so is a material suitable for various applications such as electrical and electronic equipment, precision machinery related equipment, office equipment, and automobile and vehicular related equipment.

We claim:

1. A thermotropic resin composition comprising
   (A) 100 parts by weight of a thermotropic polyester, a thermotropic polyesteramide or a mixture thereof, forming an anisotropic molten phase and
   (B) 1 to 200 parts by weight of a graphite having a fixed carbon content of 98% or more, a crystallinity of 80 to 95%, and an average particle size of 1 to 200 μm.

2. A thermotropic resin composition as claimed in claim 1, wherein the graphite (B) is a graphite having a fixed carbon content of at least 99%.

3. A thermotropic resin composition as claimed in claim 1, wherein the graphite (B) is a graphite having a crystallinity of 82 to 94%.

4. A thermotropic resin composition as claimed in claim 1, wherein the graphite (B) is a graphite having an average particle size of 1 to 20 μm.

5. A thermotropic resin composition as claimed in claim 1, wherein the thermotropic polyester, the thermotropic polyesteramide or the mixture thereof, forming an anisotropic molten phase (A) is at least one thermotropic polyester or thermotropic polyester amide selected from the group consisting of fully aromatic thermotropic polyesters, fully aromatic thermotropic polyesteramides, thermotropic polyester having ethylene dioxy units, and thermotropic polyesteramides having ethylene dioxy units.

6. A thermotropic resin composition as claimed in claim 5, wherein the thermotropic polyester has structural units of the following (I), (II), and (IV) or (I), (II), (III), and (IV).

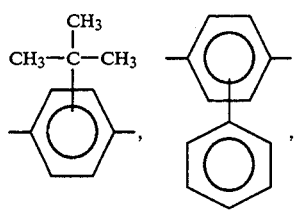  (I)

+O—R₁—O+  (II)
+O—CH₂CH₂—O+  (III)
+OC—R₂—CO+  (IV)

wherein, R₁ represents at least one selected from the group consisting of:

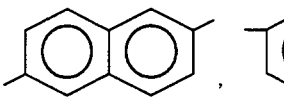

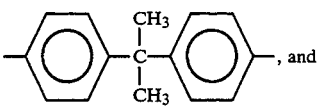

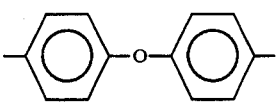

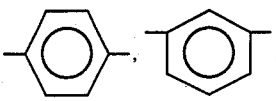

and R₂ represents at least one selected from the group consisting of:

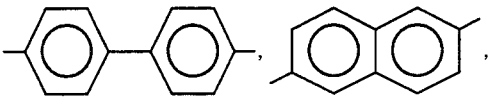

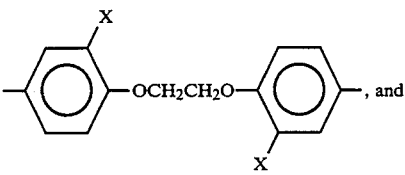

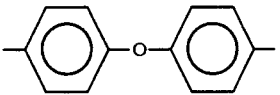

wherein, X represents a hydrogen atom or a chlorine atom and the total number of moles of the structural units (II) and (III) and the number of moles of the structural unit (IV) are equal.

7. A thermotropic resin composition as claimed in claim 1, further comprising (C) 0.5 to 60 parts by weight, based on 100 parts by weight of (A) the thermotropic polyester, a thermotropic polyesteramide or a mixture thereof, forming an anisotropic molten phase, of an organic bromide.

8. A thermotropic resin composition as claimed in claim 7, wherein the organic bromide (C) is a poly(bromostyrene) having a weight average molecular weight of $1 \times 10^3$ to $120 \times 10^4$ having as the main component at least one member of the following structural units produced from a bromostyrene monomer:

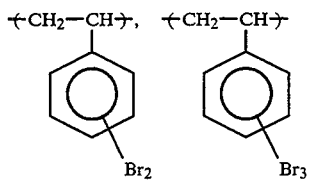

9. A thermotropic resin composition as claimed in claim 1, further comprising 200 parts by weight or less, based upon 100 parts by weight of the thermotropic resin composition according to claim 1, of a filler.

10. A thermotropic resin composition consisting essentially of (A) 100 parts by weight of a thermotropic polyester, a thermotropic polyesteramide or a mixture thereof, forming an anisotropic molten phase, wherein the thermotropic polyester has structural units of the following (I), (II), and (IV) or (I), (II), (III), and (IV).

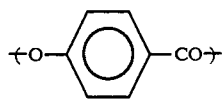 (I)

$+O-R_1-O+$ (II)
$+O-CH_2CH_2-O+$ (III)
$+OC-R_2-CO+$ (IV)

wherein, $R_1$ represents at least one moiety selected from the group consisting of:

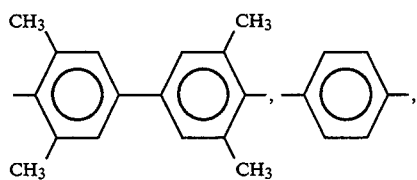

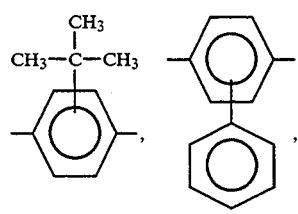

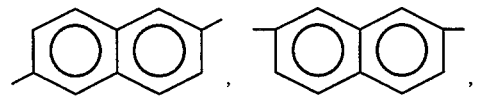

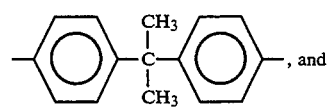, and

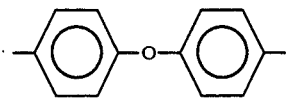

and $R_2$ represents at least one moiety selected from the group consisting of:

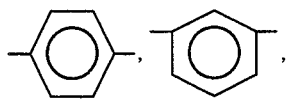

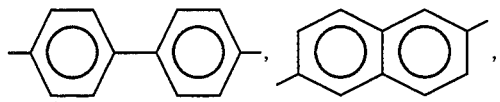

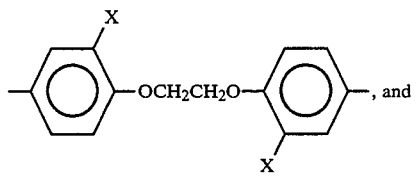, and

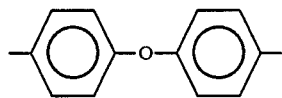

wherein X represents a hydrogen atom or a chlorine atom, (B) 1 to 200 parts by weight of a graphite having a fixed carbon content of 98% or more, a crystallinity of 80 to 95% and an average particle size of 1 to 200 μm, and an organic bromide (C).

11. The thermotropic resin composition defined in claim 10 further comprising (C) 0.5 to 60 parts by weight, based on 100 parts by weight of (A) the thermotropic polyester, a thermotropic polyesteramide or a mixture thereof, forming an anisotropic molten phase, of an organic bromide.

12. The thermotropic resin composition defined in claim 11, wherein the organic bromide (C) is a poly(bromostyrene) having a weight average molecular weight of $1 \times 10^3$ to $120 \times 10^4$ having as the main component at least one member of the following structural units produced from a bromostyrene monomer:

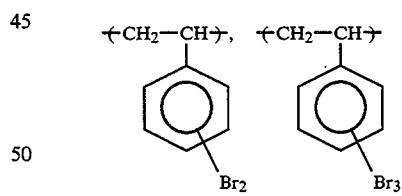

13. A thermotropic resin composition consisting essentially of (A) 100 parts by weight of a thermotropic polyester, a thermotropic polyesteramide or a mixture thereof, forming an anisotropic molten phase, wherein the thermotropic polyester has structural units of the following (I), (II), and (IV) or (I), (II), (III), and (IV).

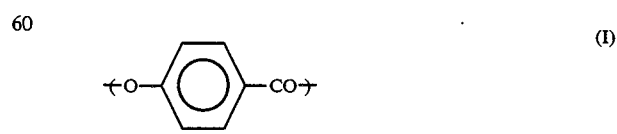 (I)

$+O-R_1-O+$ (II)
$+O-CH_2CH_2-O+$ (III)
$+OC-R_2-CO+$ (IV)

wherein, $R_1$ represents at least one moiety selected from the group consisting of:

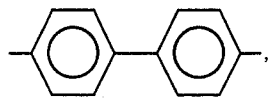

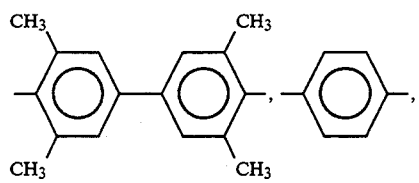

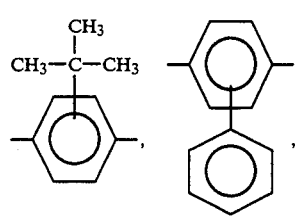

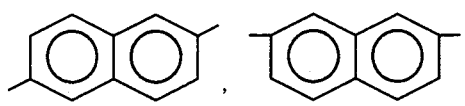

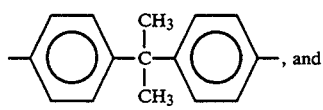, and

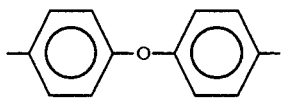

and $R_2$ represents at least one moiety selected from the group consisting of:

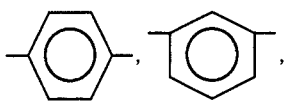

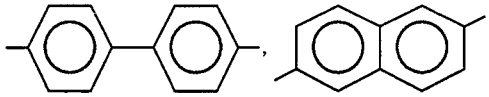

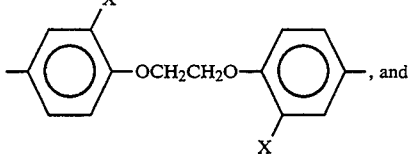, and

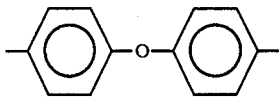

wherein X represents a hydrogen atom or a chlorine atom and (B) 1 to 200 parts by weight of a graphite having a fixed carbon content of 98% or more, a crystallinity of 80 to 95% and an average particle size of 1 to 200 μm, an organic bromide (C) and a filler (D).

14. The thermotropic resin composition defined in claim 13, wherein the filler (D) is added in an amount not more than 200 parts by weight based on 100 parts by weight of the total amount of the thermotropic polyester and/or thermotropic polyesteramide (A) and graphite (B).

* * * * *